May 10, 1949. J. M. ROTH ET AL 2,469,846
PUMP BEARING AND SEAL ASSEMBLY LUBRICATION
Filed June 25, 1945
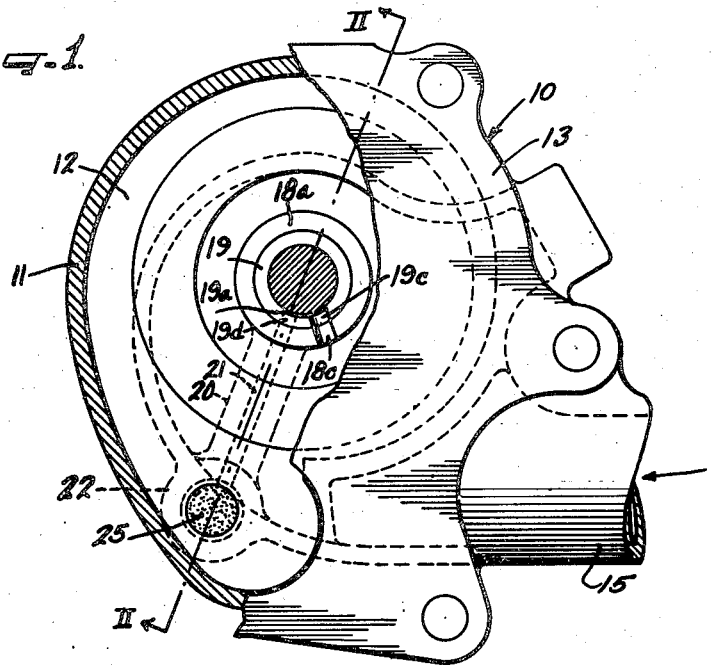
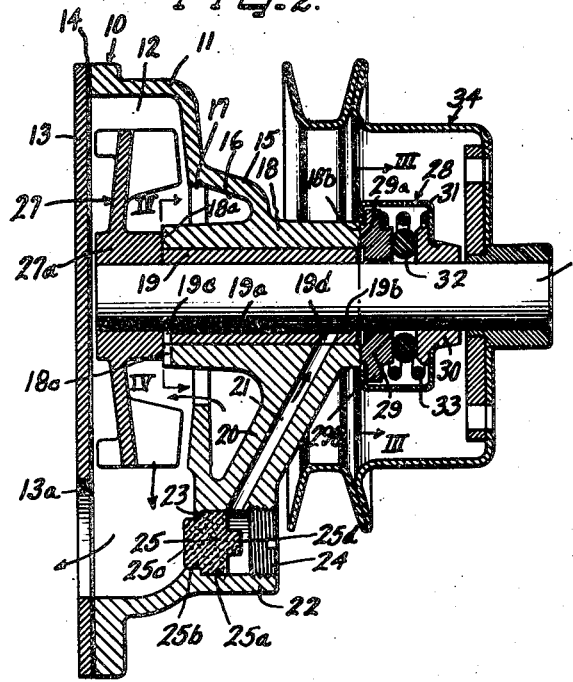
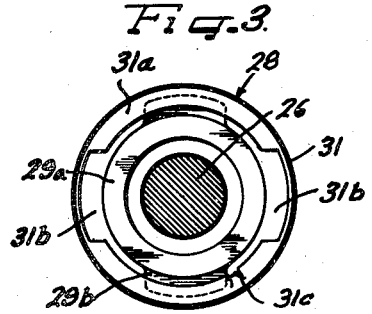
Inventors
Jay M. Roth
William C. Mahler Patented May 10, 1949

2,469,846

UNITED STATES PATENT OFFICE 2,469,846

PUMP BEARING AND SEAL ASSEMBLY LUBRICATION

Jay M. Roth, Euclid, and William C. Mahler, Cleveland, Ohio, assignors to Thompson Products, Inc., Cleveland, Ohio, a corporation of Ohio Application June 25, 1945, Serial No. 601,480

2 Claims. (Cl. 103—111)

This invention relates to shaft bearings and seals for pumps and the like wherein fluid pressured by the pump is utilized to lubricate the bearing and seal.

Specifically, the invention relates to a bearing and seal arrangement for automobile water pumps or the like wherein some of the water pressured by the pump is filtered and circulated to the bearing and seal for lubricating the same.

In accordance with this invention an automobile water pump of the centrifugal impeller type has a housing defining a pumping chamber or volute and carrying a shaft bearing sleeve which rotatably journals the impeller shaft. Leakage along the shaft is prevented by a seal which is resiliently urged into sealing engagement with an end face of the housing. The bearing sleeve and seal are preferably composed of material which has a low coefficient of friction when water-lubricated. Synthetic plastic materials such as laminated phenolic condensation products can be used for the bearing sleeve and seal. Alternatively these members can be composed of lubricant-impregnated metals such as graphite-impregnated brass or bronze, and graphite-impregnated Babbitt metal.

The bearing faces of the bearing sleeve and seal member, in accordance with this invention, are lubricated with water from the high pressure side of the pump. For this purpose, the housing carries a filter plug or strainer composed of powdered metal such as brass or iron having a relatively high degree of porosity. This plug strains water from the high side of the pump into a duct communicating with a groove in the bearing sleeve. The strained water circulates along this groove back to the low pressure side of the pump and, of course, lubricates the bearing surface of the sleeve. Some of the water also circulates to the sealing face of the seal member to lubricate this face.

It is, then, an object of this invention to provide a lubricated bearing and seal assembly especially adapted for automobile water pumps wherein water from the high side of the pump is circulated along the bearing and sealing faces to lubricate these faces and is then returned to the low side of the pump without leaking out of the pump.

A further object of the invention is to provide a lubricated pump shaft bearing wherein material pressured by the pump is circulated along the bearing back to the low side of the pump and is effective to lubricate the bearing.

A still further object of the invention is to provide a self-lubricating pump bearing.

A still further object of the invention is to provide a pump for automotive engine cooling systems with a strainer, in communication with the high side of the pump, filtering pressured liquid to the pump shaft bearing.

A still further object of the invention is to provide an automobile pump with a porous plug and a bleeder duct receiving strained pressured fluid from the plug to convey this fluid to the pump shaft of the pump for lubricating the shaft bearing.

Other and further objects of the invention will be apparent to those skilled in the art from the following detailed description of the annexed sheet of drawings which, by way of a preferred example only, illustrates one embodiment of the invention.

On the drawings:

Figure 1 is an elevational view of a pump according to this invention with parts broken away and shown in vertical cross section.

Figure 2 is a vertical cross-sectional view taken along line II—II of Figure 1.

Figure 3 is a vertical cross-sectional view taken along the line III—III of Figure 2.

As shown on the drawings:

In Figures 1 and 2 the reference numeral 10 designates generally a pump according to this invention having a housing 11 defining a pumping chamber or volute 12. The volute 12 has an open inner face closed by a plate 13 sealed to the end face of the housing by a gasket 14. An aperture 13a is provided in the plate to provide an outlet for the high pressure side of the volute 12 and, as is customary in automobile water pumps, the plate 13 is seated on a receiving face of the automobile engine with the outlet hole 13a thereof in communication with the water chamber of the engine. In some installations, the plate 13 can be removed and the housing 11 can be directly secured to the engine and sealed against a face of the engine.

The housing 11 has an inlet 15 defining a central inlet chamber 16 communicating at 17 with the central portion of the chamber 12.

A hub 18 is provided on the housing 11. This hub 18 projects through the inlet chamber 16 into the volute chamber 12 and also projects outwardly from the housing as shown in Figure 2. The hub 18 has an inner end face 18a in the central portion of the chamber 12 and an outer end face 18b.

A bearing 19 in the form of an open-ended sleeve is snugly fitted in the hub 18. This bearing 19 is preferably composed of material which has a low coefficient of friction when moistened with water. Synthetic condensation products such as phenolic resins, or graphite-impregnated bronzes and the like are satisfactory materials for the bearing sleeve.

A groove 19a, preferably of appreciable width, is formed on the inner face of the bearing sleeve 19 and extends from an end face 19b adjacent the outer end of the sleeve to a groove 19c in the inner end face of the sleeve. This groove 19c registers with a groove 18c in the end face 18a of the hub 18. An aperture 19d is formed through the sleeve 19 near the end wall 19b of the groove and, as shown in Figure 1, at the side of the groove opposite the side communicating with the groove 19c.

The pump housing has an integral leg 20 connecting the hub 18 with the main housing portion 11 on the high pressure side of the pump. A duct 21 is formed through this leg 20 in registration with the aperture 19d of the bearing sleeve 19, this aperture being located at a point remote from the pump chamber 12. The other end of the duct 21 communicates with the interior of a hollow boss 22 on the housing. This hollow boss is open ended with a reduced-diameter end in communication with the pumping chamber 12 and providing a shoulder 23 and with a threaded outer end receiving a closure plug 24.

A strainer plug 25 of porous powdered metal or the like material has a main cylindrical body portion 25a snugly fitting in the boss 22 and bottomed on the shoulder 23 together with a reduced-diameter portion 25b projecting into the pumping chamber 12 and providing a vertical end face 25c in the pumping chamber. It should be noted that the pump is so mounted on an automobile engine or the like that the face 25c will be disposed in a substantially vertical plane to permit filtered solids to be readily washed off of the face by the liquid being pumped out of the outlet 13a thereby maintaining a clean filter face. The end of the plug opposite the end face 25c has an integral lug 25d thereon at the central portion thereof so that the plug can be readily inserted and retracted from the boss 22 by a tool engaging the lug. The plug 25 preferably does not cover the duct 21.

A shaft 26 is rotatably mounted in the bearing sleeve 19 and projects beyond the end faces 18a and 18b of the hub 18. A centrifugal pump impeller 27 is mounted on the shaft 26 in the pumping chamber 12 and has the hub portion 27a thereof riding on the inner end face of the bearing sleeve 19.

A seal assembly 28 is disposed around the portion of the shaft projecting from the hub 18. This seal assembly 28 includes a seal ring 29 composed of suitable plastic or metal material with a raised inner end face 29a riding on the end face 18b of the hub 18. The seal ring 29 loosely embraces the shaft 26.

A head member 30 is pressed on the shaft 26 in spaced relation from the seal ring 29 and carries a cage or cover 31 with an end flange 31a that has recesses 31b on diametrically opposed sides thereof as best shown in Figure 3.

The seal ring 29 has ears or lugs 29b adapted to fit through the apertures 31b behind the flange 31a so that, when these ears and apertures are misaligned as shown in Figure 3, the flange will be effective to retain the seal ring within the cage. A deformable rubber ring 32 is compressed between the head 30 and seal ring 29 within the cage 31 to seal against leakage between the seal ring and shaft. A spring 33 bottomed on the cage 31 acts on the seal ring 29 to urge its end face 29a into sealing engagement with the end face 18b of the hub 18.

As shown in Figure 3, a tang 31c is turned in from the flange 31a to act as a stop for one of the ears 29b when it is rotated 90° from the apertures 31b. This tang serves to drive the seal ring with the cage 31 and engages the ear 29b so as to have a driving thrust thereon. The entire seal assembly 28 can be assembled as a unit with the seal ring 29, the rubber ring 32, and the spring 33 in the cage 31, and this assembly is then pressed on the shaft 26 to a position where the sealing face 29a of the seal ring will engage the end face 18b of the hub and the ears 29b of the seal ring will be moved into spaced relation from the flange 31a so that the spring 33 will be effective to maintain sealing contact of the seal ring with the hub.

Water or other fluid to be pumped enters the pump through the inlet 15 and circulates from the inlet chamber 16 to the central portion of the pumping chamber 12 through the opening 17. The fluid is then centrifugally whirled by the blades of the impeller and discharged out of the outlet 13a. Some of the pressured fluid is filtered through the strainer plug 25 into the duct 21 to flow along a groove 19a of the bearing sleeve 19 and back to the low pressure or inlet side of the pump through the grooves 19c and 18c. This fluid lubricates the inner face of the bearing sleeve 19 and the end face of the bearing sleeve on which the impeller hub 27a rides. In addition some fluid can flow past the end 19b of the groove 19a to lubricate the sealing face 29a of the seal ring 29. Leakage along the pump shaft is prevented by the sealing engagement of the sealing face 29a of the seal ring 29 and the end face 18b of the hub. Leakage through the sealing ring along the shaft is stopped by the rubber ring 32 and the press-fit engagement of the head member 30 on the shaft.

A pulley 34 is secured on the outer end of the shaft 26. This pulley is adapted to be driven by the fan belt of the automotive engine. Driving of the shaft 26 by the pulley 34, of course, drives the seal assembly 29 and the cage 31 of this assembly drives the seal ring 29 to rotate on the end face 18b of the hub.

From the above descriptions it will therefore be clear that this invention provides a pump assembly with a self-lubricating bearing and seal.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A lubricated bearing assembly for pumps which comprises a pump housing having a pumping chamber with a peripheral outlet and a central inlet, a central hub portion projecting into said pumping chamber, a bearing sleeve in said hub portion, a pump shaft rotatably mounted in said bearing sleeve, a leg on said housing extending from the peripheral portion of said pumping chamber to the outer end of said hub, a hollow boss on said housing communicating with the pumping chamber, a filter plug in said hollow boss having a substantially vertical end face in said pumping chamber, said vertical end face being positioned for cleansing action by the flow of fluid in the pumping chamber, and said leg having a passage therethrough connecting said boss with the inner face of said bearing sleeve to conduct fluid from the pumping chamber through said filter plug to the pump shaft for lubricating the shaft.

2. A lubricant bearing assembly for pumps which comprises a pump housing having a pumping chamber with a peripheral outlet and a central inlet, said housing having a central hub with an inner end projecting into said pumping chamber and an outer end face remote from said inner end, a seal ring having a sealing face riding against the outer end face of said hub, a bearing sleeve in said hub having a longitudinal duct passing through the end thereof adjacent the inner end of the hub, a pump shaft rotatably mounted in said bearing sleeve, a passaged leg on said housing extending from the peripheral portion of said pumping chamber to the outer end of said hub and having the passage thereof communicating with said longitudinal duct in the bearing sleeve, a hollow boss on said housing communicating with said pumping chamber and passage in said leg, a filter plug removably mounted in said hollow boss and having a substantially vertical end face in said pumping chamber, said vertical end face being positioned for cleansing action by flow of fluid in said pumping chamber, a removable closure member for said hollow boss giving access to said filter plug, said longitudinal duct being in communication at its inner end with the central portion of said pumping chamber and at its outer end with the sealing face of said seal ring whereby fluid from the peripheral portion of the pumping chamber will be filtered through said plug to flow through the passage in said leg and through the longitudinal duct in said bearing sleeve to lubricate the pump shaft and seal ring and whereby circulation of said fluid is insured by communication of the longitudinal duct with the central portion of the pumping chamber.

JAY M. ROTH.
WILLIAM C. MAHLER.

REFERENCES CITED

The following references are of record in the file of this patent:

UNITED STATES PATENTS

| Number | Name | Date |
|---|---|---|
| 350,362 | Hawley | Oct. 5, 1886 |
| 1,722,179 | Evens | July 23, 1929 |
| 1,733,416 | Lebesnerrois | Oct. 29, 1929 |
| 1,752,006 | Kalb | Mar. 25, 1930 |
| 1,931,724 | Fageal et al. | Oct. 24, 1933 |
| 2,027,505 | Winkler | Jan. 14, 1936 |
| 2,257,349 | Sherwood | Sept. 30, 1941 |